United States Patent [19]

Klemann et al.

[11] 4,293,623
[45] Oct. 6, 1981

[54] ELECTROLYTES FOR ALKALI-METAL ELECTROCHEMICAL DEVICES

[75] Inventors: Lawrence P. Klemann, Somerville; Gerald H. Newman, Westfield; Eugene L. Stogryn, Edison; Thomas A. Whitney, Roselle; Dan Farcasiu, Princeton, all of N.J.

[73] Assignee: Exxon Research & Engineering Co., Florham Park, N.J.

[21] Appl. No.: 165,412

[22] Filed: Jul. 3, 1980

[51] Int. Cl.$^3$ ............................................. H01M 6/16
[52] U.S. Cl. .................................... 429/194; 429/198
[58] Field of Search ................. 429/194, 195, 197, 198

[56] References Cited

U.S. PATENT DOCUMENTS

| | | | |
|---|---|---|---|
| 4,060,674 | 11/1977 | Klemann | 429/194 |
| 4,104,450 | 8/1978 | Whitney et al. | 429/194 |
| 4,104,451 | 8/1978 | Klemann et al. | 429/194 |
| 4,117,213 | 9/1978 | Whitney et al. | 429/194 |
| 4,139,681 | 2/1979 | Klemann et al. | 429/194 |
| 4,169,808 | 10/1979 | Klemann et al. | 252/182.1 |

OTHER PUBLICATIONS

A. B. Levy, J. Org. Chem., 43, 4684-4685 (1978).

A. Suzuki et al., Tetrahedron, 27, 2775-2783 (1971).

*Primary Examiner*—Donald L. Walton
*Attorney, Agent, or Firm*—Robert S. Salzman

[57] ABSTRACT

An electrolyte for an alkali metal electrochemical device features (a) an organic solvent; and (b) at least one electrolytically active alkali-metal complex anion salt. The salt has the formula:

$$ZMR_xQ_y$$

wherein Z is an alkali-metal; wherein M is an element selected from a group consisting of B, Al, Ga, In, Tl, P, As, Zn, Cd and Sn (stannous); wherein Q represents at least one heteroatom grouping bonded to M, the core element, through a carbon-M bond; wherein R is selected from a group consisting of: heteroatom-containing groups bonded to M, the core element, through the heteroatom site, alkyls, aryls, alkaryls, aralkyls, halogens, halogen substituted aryls, halogen substituted alkaryls, and pseudohalides; and wherein x and y are positive integers, a sum of x plus y being equal to one plus the valence of the metal M, and further, wherein x can be zero.

20 Claims, 4 Drawing Figures

(MATERIAL UTILIZATION (TiS$_2$, %) vs. DISCHARGE CYCLE NUMBER FOR A Li-TiS$_2$ CELL OPERATING WITH A 1.4 mol/L. SOLVENT, Li$^+$[B(⟨S⟩)$_4$]$^-$ IN DIOX/DME : 54/46)

FIG. 4

(LEVEL OF TiS$_2$ MATERIAL UTILIZATION vs. Li F.O.M. IN A Li-TiS$_2$ CELL CONTAINING Li$^+$ [(C$_2$H$_5$)$_2$B(⟨S⟩)$_2$]$^-$-DIOXOLANE)

ELECTROLYTES FOR ALKALI-METAL ELECTROCHEMICAL DEVICES

RELATED U.S. PATENTS

The following patents relate to the use of various electrolytes in alkali-metal electrochemical systems: U.S. Pat. No. 4,060,674, issued Nov. 29, 1977; U.S. Pat. No. 4,104,450, issued Aug. 1, 1978; U.S. Pat. No. 4,104,451, issued Aug. 1, 1978; U.S. Pat. No. 4,117,213, issued Sept. 26, 1978; U.S. Pat. No. 4,139,681, issued Feb. 13, 1979; and U.S. Pat. No. 4,169,808, issued Oct. 2, 1979.

These patents are assigned to a common assignee and are meant to provide a background of similar alkali-metal electrochemical systems. Such teachings as are provided in these patents can serve as a means of comparison between the prior electrochemical systems and the subject invention. The text of these patents, therefore, is meant to be incorporated herein by way of reference.

FIELD OF THE INVENTION

This invention relates to alkali-metal electrochemical devices and more particularly to a class of electrolytes for these electrochemical devices comprising an organic solvent containing novel alkali-metal complex anion salts having at least one heteroatom group bonded to the core atom of the salt through a carbon bond.

BACKGROUND OF THE INVENTION

Alkali-metal electrochemical systems generally require nonaqueous electrolytes. Such electrolytes usually comprise organic solvents and electrolytically active alkali-metal salt solutes, as taught for example by U.S. Pat. No. 4,104,450, issued Aug. 1, 1978.

The particular electrolyte used in these alkali-metal electrochemical devices is an extremely important factor in obtaining efficacious performance.

The choice of a proper and effective electrolyte is not always predictable in advance. Sometimes, as in the case of the present invention, the choice of electrolyte is completely contrary to established teachings.

It has been observed that for alkali-metal batteries the discharge rate will be improved with the amount of solute which can be dissolved in the electrolyte solution.

It has been discovered that alkali-metal complex anion salt solutes of the general formula suggested by the aforementioned patent and hereinafter described have been most useful in this regard. These complex anion salt solutes are not only more soluble in typical organic solvents such as dioxolane, but also provide improved anodic stability, i.e., the electrolyte is oxidatively stabilized.

Electrolytes having anodic stability are most desirable in alkali-metal battery systems, because they allow for improved storage and shelf life.

Spontaneous or premature discharge of the battery is prevented.

In general, it has been demonstrated in the U.S. Pat. No. 4,104,540 that heteroatom-containing substituents which are bonded to the core element of the complex anion salt through the heteroatom itself provide adequate anodic stability. Such salts, however, many not simultaneously provide sufficient solubility of the salt in the solvent.

It has now been discovered, with reference to this invention, that the solubility of a complex anion of salt may be further improved, and the anodic stability of the electrolyte maintained or further enhanced, by bonding the heteroatom groupings to the core element via a ring carbon atom. The choice of this electrolyte solute is not obvious.

Many published reports demonstrate that when such a heteroatom grouping is bonded to boron through a ring carbon atom, the resulting salt becomes extremely reactive. This reactivity leads to the subsequent destruction of the complex anion system. Naturally such reactivity is not desirable when formulating electrolytes, particularly where improved anodic stability is sought.

Two published reports which demonstrate the aforementioned reactivity of carbon-bonded heteroatom groupings to boron can be found in the articles to: A. B. Levy, *J. Org. Chem.*, 43, 4684–5 (1978); and A. Suzuki, N. Miyaura and M. Itoh, *Tetrahydron*, 27, 2775–83 (1971).

In addition, another study has shown that alkali-metal salts of complex anions substituted with carbon-bonded thienyl (heteroatom) groupings generally exhibit low solubilities. This teaching can be found in the Ph.D thesis of G. E. Paley, entitled "Studies in Tetrathienyl-borates—Their Synthesis and Analytical Properties", Loyola University (1979), University Microfilms.

Obviously, the low solubilities predicted for these salts suggest that they would be a poor choice as solutes in electrolytes of alkali metal batteries.

Therefore, it is not obvious that salts of this type, which are the subject of this invention, are useful in formulating electrolytes.

BRIEF SUMMARY OF THE INVENTION

The invention pertains to an electrolyte for an alkali-metal electrochemical device. The electrolyte comprises:

(a) an organic solvent selected from a group consisting of ethers, esters, sulfones, organic sulfites, organic sulfates, organic nitrites and organic nitro compounds; and (b) at least one electrolytically active alkali-metal complex anion salt having the formula:

$$ZMR_xQ_y$$

wherein Z is an alkali metal; wherein M is an element selected from a group consisting of B, Al, Ga, In, Tl, P, As, Zn, Cd and Sn (stannous); wherein Q represents at least one heteroatom grouping bonded to M, the core element, through a carbon-M bond; wherein R is selected from a group consisting of: heteroatom-containing groups bonded to M, the core element, through the heteroatom site, alkyls, aryls, alkaryls, aralkyls, halogens, halogen-substituted aryls, halogen-substituted alkaryls, and pseudohalides; and wherein x and y are positive integers, a sum of x plus y being equal to one plus the valence of the metal M, and further, wherein x can be zero.

The preferred organic solvent contains an ether, and generally contains a substantial amount of dioxolane or a mixture thereof.

The preferred element M is boron.

The heteroatom groupings defined by Q may be selected from a group consisting of:

In these examples, the X' substituent will most likely be a small alkyl of about 1 to 3 carbon atoms.

The above heteroatom groupings can be bonded to M so as to include both the heteroatom and M in a cyclic structure (a ring) as is illustrated below. In these examples, Y may be O, S, or NX'.

The heteroatom-containing groups as defined by R may be selected from a group consisting of:

The above R groups are bonded to M, the core element, through the heteroatom.

The pseudohalides as defined by R can include $SCN^-$, $SeCN^-$, $CN^-$ or $OCN^-$.

It is an object of this invention to provide an improved electrolyte for alkali-metal electrochemical systems;

It is another object of the invention to provide an electrolyte for alkali-metal electrochemical systems, which features a solute salt having a solubility and anodic stability sufficient for formulating an organic electrolyte.

These and other objects of this invention will become more apparent and will be better understood with reference to the following detailed description considered in conjunction with the accompanying drawings.

DETAILED DESCRIPTION OF THE INVENTION

Generally speaking, the invention features an improved class of electrolytes for use in alkali-metal electrochemical devices. The new electrolytes feature an organic solvent containing a complex anion salt solute of the general formula:

$$ZMR_xQ_y$$

wherein Z is an alkali metal; wherein M is an element selected from a group consisting of B, Al, Ga, In, Tl, P, As, Zn, Cd and Sn (stannous); wherein Q represents at least one heteroatom grouping bonded to M, the core element, through a carbon-M bond; wherein R is selected from a group consisting of: heteroatom-containing groups bonded to M, the core element, through the heteroatom site, alkyls, aryls, alkaryls, aralkyls, halogens, halogen-substituted aryls, halogen-substituted alkaryls, and pseudohalides; and wherein x and y are positive integers, a sum of x plus y being equal to one plus the valence of the metal M, and, further, wherein x can be zero.

Illustrative of the invention is the following preparation and use of the complex boron salt,

[Lithium tetrakis(2-thienyl)boride] for use in an electrolyte of an alkali-metal battery.

The sequence of reactions capable of yielding this type of salt are given by the following equations:

(1)

(2)

Although the lithium tetrakis(2-thienyl)boride may be obtained by above reaction, the level of purity may not be sufficient in some instances to realize maximum performance in an electrochemical cell. This salt may then be purified according to the following reactions:

(3)

(4)

The following example typifies the procedure used to prepare the subject salt:

EXAMPLE 1—Preparation of Lithium tetrakis(2-thienyl)boride

Two moles of butyl lithium (2.2 M in hexane) are added, over a period of 1.75 hr., to 208 mL of thiophene in 1.8 L of ether at reflux temperature. After an additional 5.5 hr. at reflux, the reaction was allowed to stir overnight at ambient temperature. The reaction was cooled to <20° C., and 48 mL of $BF_3.Et_2O$ was added over a twenty-minute period. Stirring was continued for 4 hrs. at ambient temperature and the reaction poured onto ice. The ether layer was separated and evaporated at reduced pressure. The residue was dissolved in 400 mL of water, extracted with hexane, and treated with activated charcoal. Addition of the filtered solution to 600 mL of $NH_4OH$ saturated with $NH_4OAc$ precipitated ammonium tetrakis(2-thienyl)boride.

The dried ammonium salt, 0.2 mole, in 200 mL of dimethoxyethane (DME) was added to 0.8 mole of LiH slurried in 50 mL of DME. The reaction was refluxed until ammonia evolution ceased, filtered and concentrated. The salt was isolated as a white solid having a composition of $LiB(2-thienyl)_4.3DME$.

The lithium tetrakis(2-thienyl)boride salt prepared in DME was dissolved in dioxolane at a concentration of about 1.4 moles of salt in 1,000 mL of solvent. The ratio of solvents in this final solution was 54 V.% dioxolane and 46 V.% DME. The measured resistivity was 200 ohm-cm.

Figure 1:
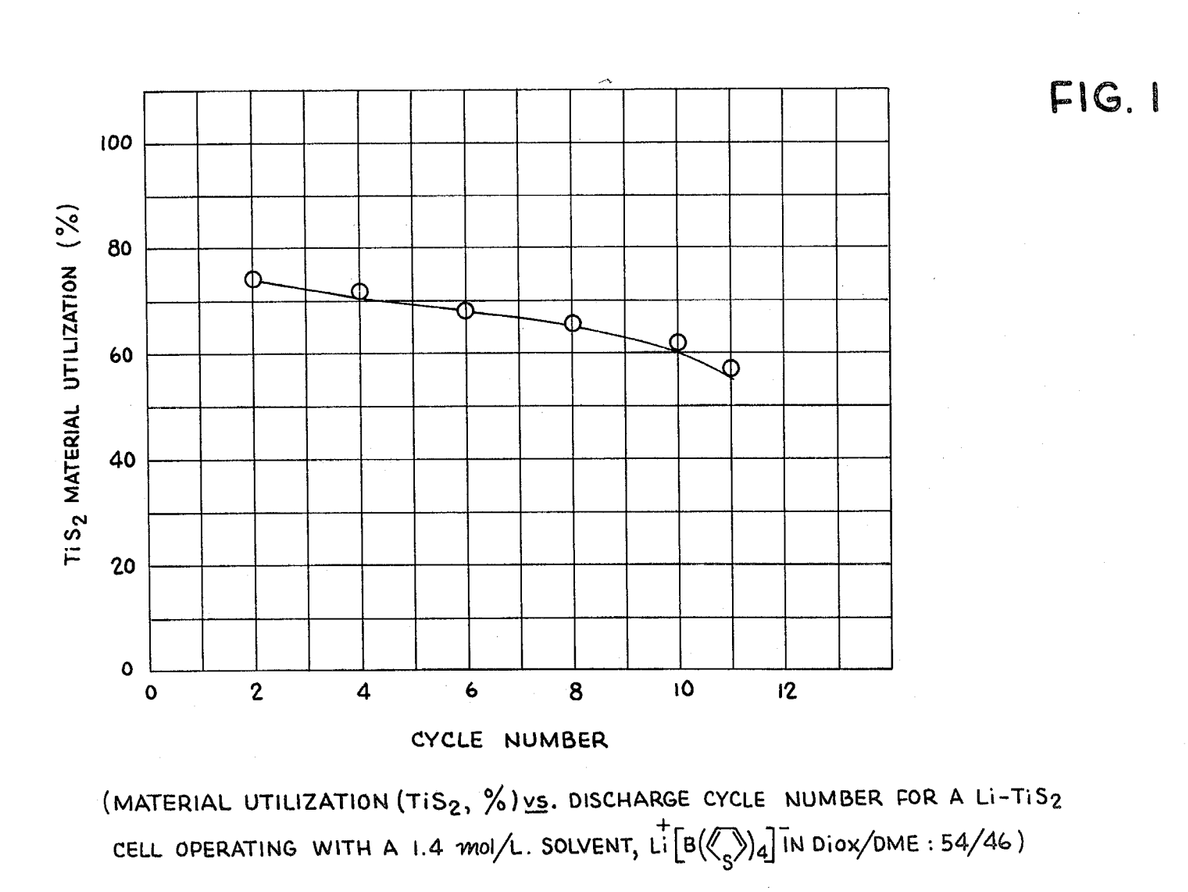
FIG. 1 is a graph of the cycling characteristics of a standard electrochemical cell utilizing one of the electrolytes defined by this invention.

Bag cells were constructed with this electrolyte which contained 1 in² Li anodes and 1 in² $TiS_2$ cathode in a sandwiched configuration. The primary discharge obtained at 0.8 mA/cm² discharge rate was equal to 75%. The cell was cycled 11 times to a material utilization (M.U.) of 58% as shown in FIG. 1. The F.O.M. of $TiS_2$ achieved was equal to 7.3.

Other complex borate salts can be synthesized according to the following reactions:

(5)

(6)

(7)

(8)

-continued (9)

The general procedure for synthesizing the above salts is given in the following example:

EXAMPLE 2

A diethylether solution of the appropriate boron containing reagent is added to a hexane-ether solution of thienyllithium (prepared from butyllithium and thiophene) cooled to between $-20°$ to $-60°$ C. with stirring. In each case about 10% excess thienyllithium, over the amount required by the reaction stoichiometry, is employed.

The reaction mixture is allowed to warm slowly to room temperature and then stirring is continued overnight. Sufficient methanol is then added dropwise to decompose any unreacted 2-thienyllithium, and then after about 15 minutes an excess of lithium hydride is added to consume any remaining unreacted methanol. After stirring the mixture overnight, it is filtered and washed with ether in the case of the products of Equations (5), (6) and (8) or with dioxolane in the case of the products of Equations (7) and (9).

The combined filtrate and washings are combined and evaporated. The residue (either an oil or a solid) is washed with pentane and then is washed with, or recrystallized from, toluene to provide purification. The product is finally dissolved in dioxolane and, upon cooling, a dioxolane solvate crystallizes from the solution. The dioxolane solubilities at ambient temperature for the salts of Equations (5) through (9) are listed below in Table I:

TABLE I
APPROXIMATE DIOXOLANE SOLUBILITIES OF 2-THIENYL SUBSTITUTED BORIDE SALTS OF LITHIUM

| Salt | Eq. (5) | Eq. (6) | Eq. (7) | Eq. (8) | Eq. (9) |
|---|---|---|---|---|---|
| Solubility Moles/L. Dioxolane | 2.5 | 2 | 1.02 | 1.37 | 0.83 |

The specific resistivitites of 0.75 molal dioxolane solutions of the above salts are listed below in Table II.

TABLE II
SPECIFIC RESISTIVITIES OF DIOXOLANE SOLUTIONS OF LITHIUM (2-THIENYL) SUBSTITUTED BORIDE SALTS

| Salt | Eq. (5) | Eq. (6) | Eq. (7) | Eq. (8) | Eq. (9) |
|---|---|---|---|---|---|
| Specific Resistivities (ohm cm) | 160 | 194 | 236 | 232 | 232 |

Figure 2:
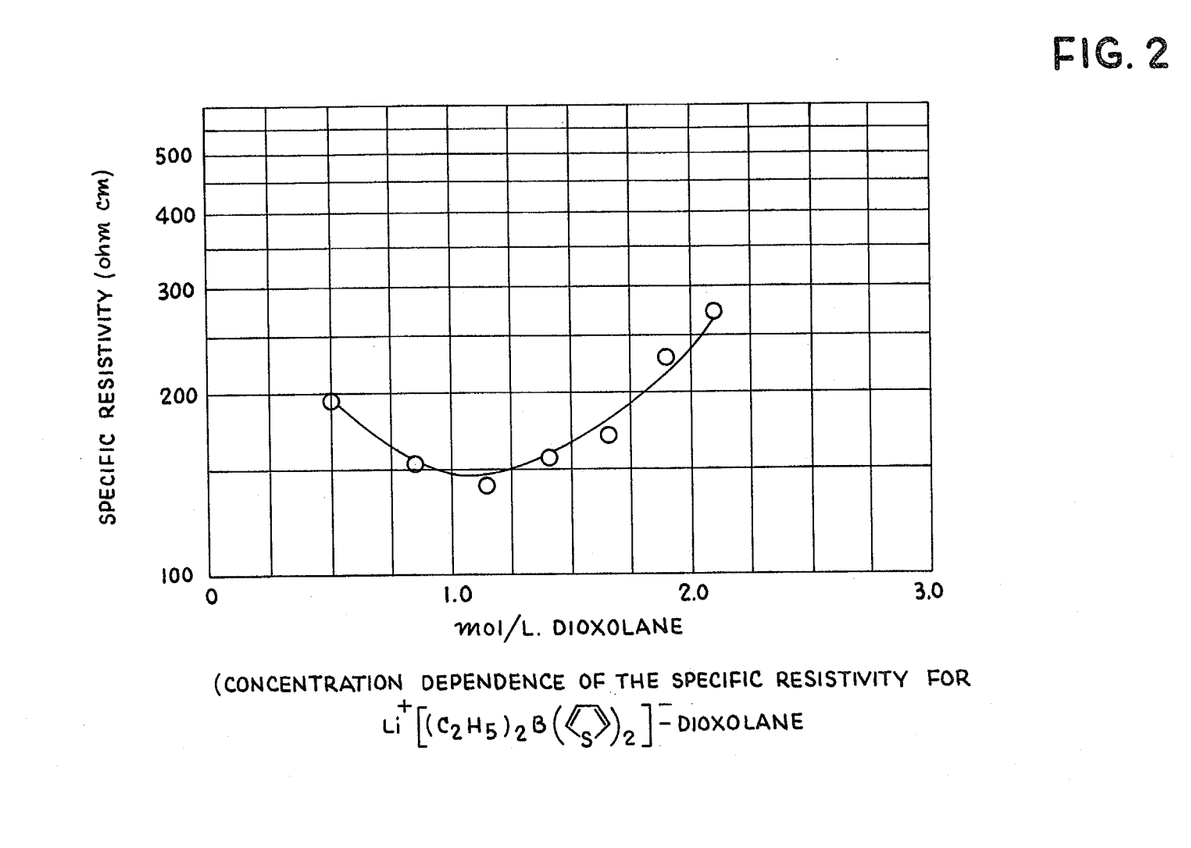
FIG. 2 is a graph showing the solubility-resistivity relationship of another electrolyte defined by this invention.

The salt of Equation (5), Li(Thienyl)$_2$(ethyl)$_2$B, was prepared according to the above Example (Example 2), and its solubility in dioxolane was measured with respect to the resistivity of the electrolyte, as shown in FIG. 2.

Figure 3:
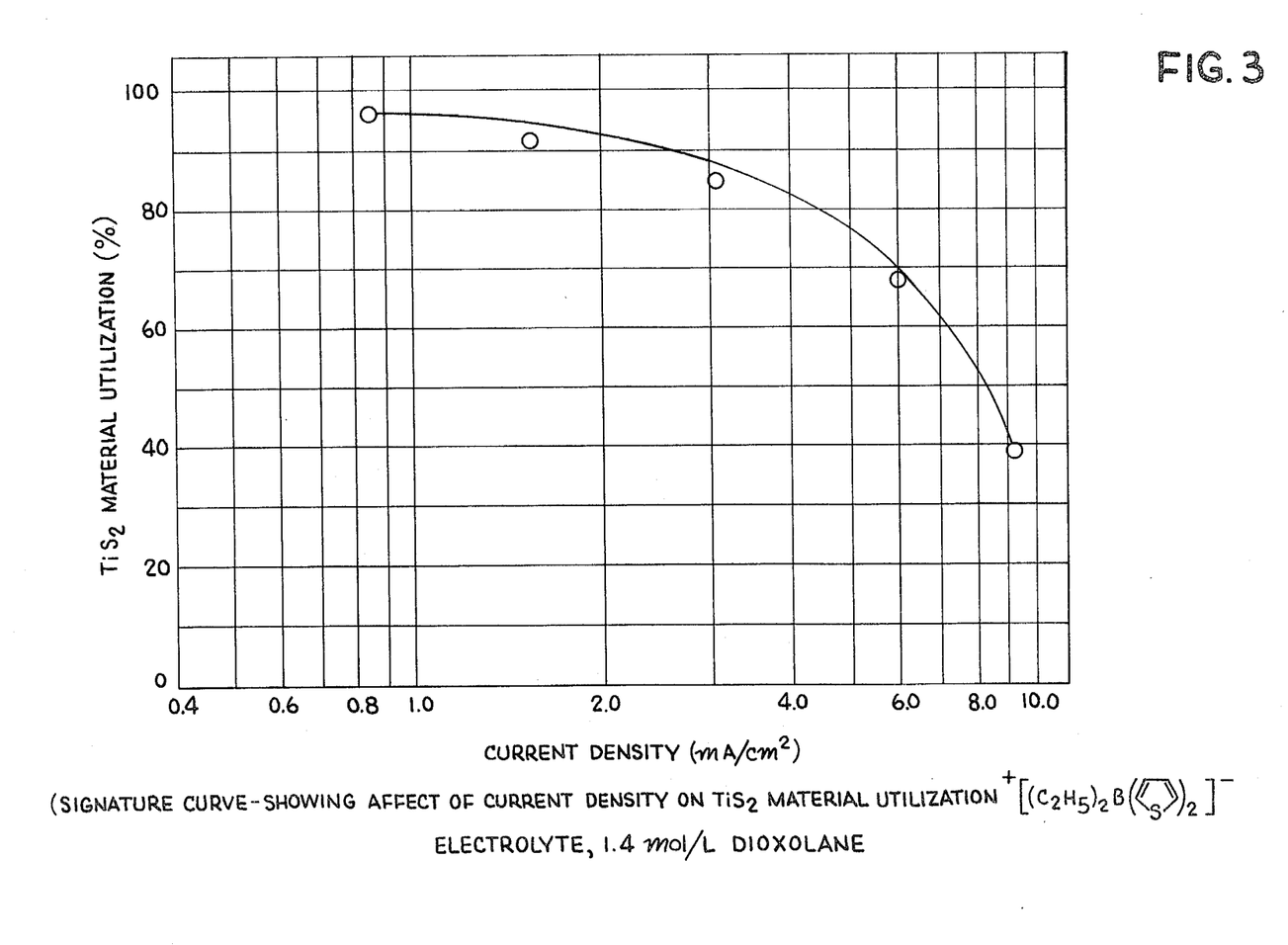
FIG. 3 is a graph depicting a signature curve illustrating the rate capability for the electrolyte shown in FIG. 2.

Referring to FIG. 3, a signature curve for the aforementioned salt is shown in a Li/TiS$_2$ cell. This signature curve indicates that this electrolyte system yields cell behavior capable of moderate-to-high rate performance.

Figure 4:
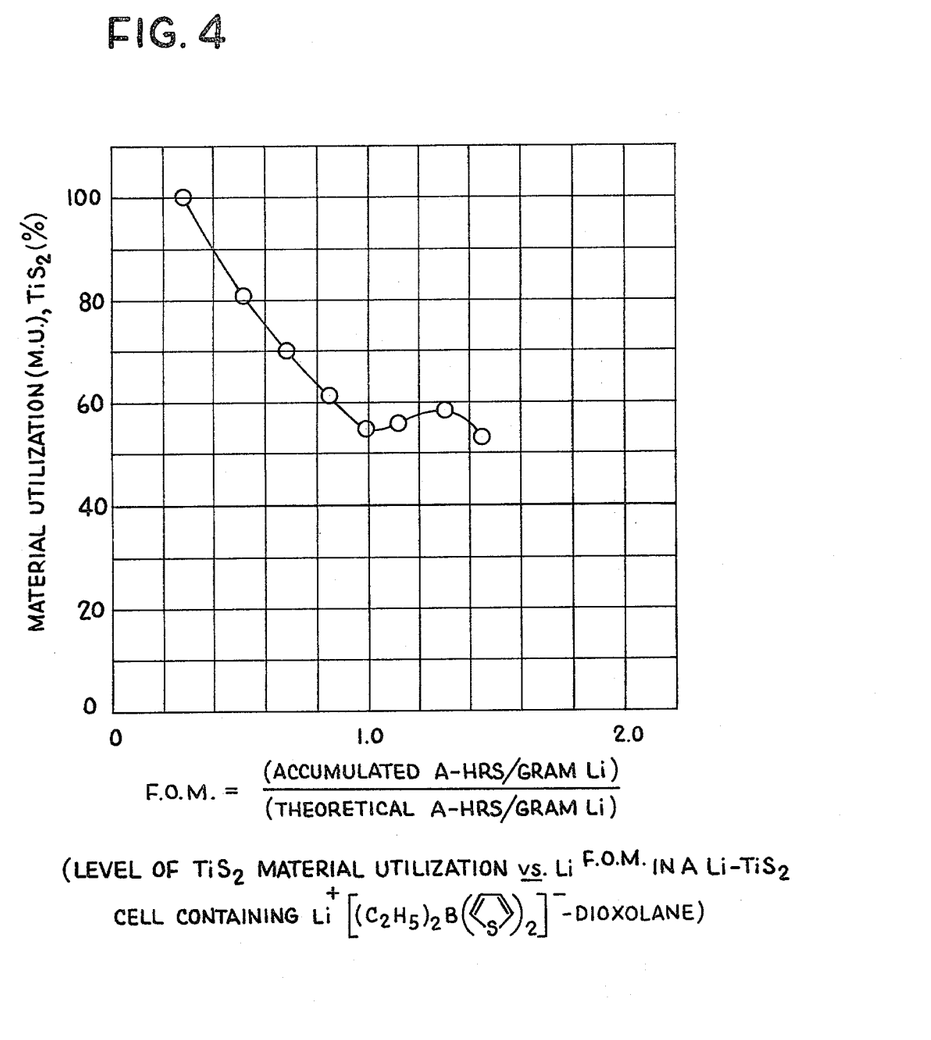
FIG. 4 is a graph illustrating the cycling characteristic of a cell containing the electrolyte illustrated in FIGS. 2 and 3.

FIG. 4 illustrates a cycling characteristic for the cell depicted in FIG. 3. The cell of FIG. 4 is cycling at 1.5 mA/cm$^2$ discharge and 0.8 mA/cm$^2$ charge. Preparation of a heterocyclic boride salt is shown in the following examples.

EXAMPLE 3

The preparation of lithium diethyldiphenyl (2,2'-oxo) boride is an example of a boride salt which contains boron and oxygen in a six-membered, heterocyclic ring.

The synthesis begins with a double directed metallation of diphenylether with TMED.Butyllithium in hexane as shown in Equation 10 below. The dilithio intermediate presumed to have the stoichiometry shown, as isolated in 59% yield.

(10)

In the dry-box, the first intermediate was added in portions to an ether solution containing one equivalent of diethylmethoxyboron. After heating this mixture at reflux and stirring overnight, 20.5 g of precipitate was collected. Allowing for the theoretical amount of lithium methoxide (2.28 g) which was expected in the precipitate, the yield of the second intermediate was 18.2 g (84%). NMR characterization of the second intermediate in dioxolane revealed a 1:1 stoichiometry of TMED:salt.

The precipitate which contained the second intermediate was contacted with DME and the insoluble LiOME residue was removed by filtration. The solution was vacuum evaporated to remove TMED and the residue obtained was redissolved in fresh DME. After repeating this procedure two more times, the final DME solution was refrigerated. Crystals formed and were characterized as (DME)$_2$ LiBEt$_2$(—C$_6$H$_4$—O—C$_6$H$_4$—), the heterocyclic boride salt product. The yield of the heterocyclic boride salt product, free of TMED, was 18 g (71%) based on the first intermediate.

EXAMPLE 4

The heterocyclic lithium salt product was prepared from N-phenylpyrrole by the sequence shown below in Equation (11):

(11)

The first intermediate was isolated (27% yield) by filtration. Derivatization of a portion of the first intermediate with (CH$_3$)$_3$SiCl gave a dilute solution whose nmr spectrum exhibited the proper ratio of aromatic/trimethylsilyl protons, although the latter appeared as two resonances of unequal (1:3) intensity. The (CH$_3$)$_3$SiCl derivatization of the first intermediate may involve side reactions not uncommon for dilithio reagents and (CH$_3$)$_3$SiCl.

The solid TMED adduct of the first intermediate was treated with an ether solution of Et$_2$BOMe, and a precipitate formed. The recovered precipitate was extracted with dioxolane (to separate product from insoluble LiOMe), and the solution contained the second intermediate complex anion salt based on $^1$H nmr analysis (7:16:10 ratio of aromatic:TMED:Ethyl protons). The concentrated diethylether solution contained more of the second intermediate. Structural formulation of the second intermediate was supported by its $^{13}$C nmr spectrum.

To confirm the ionic formulation of the second intermediate resistivity measurements were made in dioxolane solution as shown below in Table III.

TABLE III

| Concentration (moles/liter of Solvent) | Resistivity (ohm-cm) |
|---|---|
| 1.60 | 233 |
| 1.24 | 210 |
| 1.02 | 211 |

TABLE III-continued

| Concentration (moles/liter of Solvent) | Resistivity (ohm-cm) |
|---|---|
| 0.75 | 234 |
| 0.45 | 333 |
| 0.32 | 454 |

The chelating diamine in the second intermediate was displaced by dissolving the salt in dimethoxyethane (DME), then evaporating the solution. Repetition of this procedure gave the solid product characterized by $^1$H nmr in DMSO-d$_6$.

EXAMPLE 5

A 2.36 g (26.2 millimoles) portion of thiophene was dissolved in 12.5 mL of (C$_2$H$_5$)$_2$O. The solution was heated to 37° C. and 25 millimoles of n-C$_4$H$_9$Li in hexane-ether (32 mL total n-BuLi solution) was added over a 20-minute period. The reaction mixture was maintained at 37° C. for one hour to complete the formation of thienyl lithium A 5.23 g (25 millimole) portion of tripyrrole boron (B(NC$_4$H$_4$)$_3$) was dispersed in a mixture of 76 mL of toluene and 25 mL (C$_2$H$_5$)$_2$O and the slurry was cooled to —80° C. To the cold B(NC$_4$H$_4$)$_3$ slurry was added the above thienyl lithium mixture with stirring over a 30-minute period with an additional 10 mL of ether. The reaction mixture was maintained at —80° C. for 15 minutes and then allowed to warm to 25° C. for a two-hour period. The liquid two-phase mixture was stirred for two hours at room temperature and was then stripped of solvent on a rotary evaporator under vacuum affording 7.4 g of crude salt, A 5.7 g portion of the crude salt was dissolved in 33.9 g of dioxolane at 60° C. and the solution was allowed to cool to 25° C. whereupon a crop of crystals deposited which was recovered by filtration, wt. 9.81 g. The recrystallized product was found to contain four molecules of dioxolane by NMR and elemental analyses. Theory for Li[B(NC$_4$H$_4$)$_3$(C$_4$H$_3$S)]·(C$_3$H$_6$O$_2$)$_4$: C, 56.48%; H, 6.60%; N, 7.06%, S, 5.39%. Found C, 56.19%; H, 6.55%, N, 7.27%; S, 4.96%.

Recrystallized lithium tri(N-pyrrolyl)(2-thienyl) boride was found to have the following resistivities (Table V below) in 70% dioxolane—30% dimethoxyethane using a Barnstead Conductivity Bridge Model PM-70CB and a Yellow Spring Instrument Co., Inc. type 3403 conductivity cell at 26° C. (similar instrumentation was used in all conductivity measurements);

TABLE IV

| Concentration (moles/liter of Solvent) | Resistivity (ohm-cm) |
|---|---|
| 2.0 | 249 |
| 1.5 | 201 |
| 1.0 | 188 |
| 0.5 | 240 |

The solution with the resistivity of 188 ohm-cm was found to have an anodic stability of 3.62 volts @ 10 m/cm$^2$ on platinum (vs Li/Li$^+$).

EXAMPLE 6

A 7.59 g (21 millimoles) portion of was dissolved in 20 mL of dioxolane. To this solution was added dropwise a solution of 1.57 g (21.5 millimoles) of in 20 mL dioxolane. The reaction mixture was stirred for one hour at room temperature, heated to 60° C. for seven hours and was filtered. A filtration residue of 0.82 g of LiOCH$_3$ was recovered. The filtrate was stripped on a rotary evaporator under vacuum to a weight of 8.61 g. NMR analysis of the crude product was consistent with that expected for salt containing some dioxolane.

The crude salt as prepared above was found to have the following resistivities in pure dioxolane using the same apparatus described in Example 5, as shown in Table V below:

TABLE V

| Concentration (moles/liter of Solvent) | Resistivity (ohm-cm) |
|---|---|
| 1.26 | 327 |
| 1.0 | 321 |
| 0.5 | 418 |

It has been discovered that combinations of substituent groups, R, can afford complex anions whose lithium salts show enhanced solubility in dioxolane, a cyclic five-membered ring acetal/ether. This phenomenon is illustrated by the data which is contained in Table VI below.

TABLE VI
EFFECT OF BORON COMPLEX ANION STRUCTURE ON LITHIUM SALT SOLUBILITY IN DIOXOLANE

| Complex Anion Structure | Solubility moles/ liter of Dioxolane |
|---|---|
| LiB(—⟨phenyl⟩)$_4$ | 0.97 |
| LiB(—⟨phenyl⟩)$_3$(—⟨thienyl⟩) | 1.02 |
| LiB(—⟨phenyl⟩)$_2$(—⟨thienyl⟩)$_2$ | 1.37 |
| LiB(—⟨phenyl⟩)(—⟨thienyl⟩)$_3$ | 0.83 |
| LiB(—⟨thienyl⟩)$_4$ | ~0.5 |

As can be seen by inspection of the data in Table VI, the lithium salts with anions composed of combinations of phenyl and 2-thienyl substituents are more soluble in dioxolane than are the parent systems which contain only phenyl or only 2-thienyl substituents.

Stability toward oxidation is a highly desirable feature in an alkali metal battery since it is this feature that enables such systems to be stored for extended periods of time without suffering spontaneous discharge and consequential loss of capacity. This desirable quality is often referred to as the "shelf life" of a battery. Therefore, good "shelf life" will correlate with high anodic stability.

The data presented in Table VII below reveals the effect of complex anion structure on the anodic stability of the corresponding ether solutions. The larger the value measured (at 10 mA/cm$^2$ on a Pt electrode versus the Li/Li$^+$ couple) in volts, the greater the anodic stability. These measurements show, therefore, that an anion substituted with groups and bonded to the core element, B, through the heteroatom, N, is more anodically stable than a comparable system substituted with groups, which contains no heteroatom but is bonded through a ring carbon.

However, continuing to refer to the data in Table VII, when the grouping (bonded to B through a carbon) is incorporated into a boron complex anion, an even greater level of anodic stability is gained. This is really a surprising result that could not have been predicted in advance of the experiment. So heteroatom groupings that are bonded through carbon to a core element, M, result in complex anions which have surprising levels of anodic stability and as such are very useful in organic electrolyte applications.

TABLE VII

EFFECT OF BORON COMPLEX ANION STRUCTURE ON THE ANODIC STABILITY OF THE CORRESPONDING LITHIUM SALT IN DIOXOLANE

| Salt Structure | Potential in Volts (for 10 mA/cm² on Pt vs Li/Li⁺) |
| --- | --- |
| LiB(—⟨⟩)₄ | 3.54 Volts |
| LiB(—N⟨⟩)₄ | 3.65 Volts |
| LiB(—⟨S⟩)₄ | 3.74 Volts |

Having thus described the invention, what is desired to be protected by Letters Patent is presented by the following appended claims.

What is claimed is:

1. An electrolyte for an alkali-metal electrochemical device, comprising:
   (a) an organic solvent selected from a group consisting of ethers, esters, sulfones, organic sulfites, organic sulfates, organic nitrites and organic nitro compounds; and
   (b) at least one electrolytically active alkali-metal complex anion salt having the formula:

$ZMR_xQ_y$ wherein Z is an alkali metal;
   wherein M is an element selected from a group consisting of B, Al, Ga, In, Tl, P, As, Zn, Cd and Sn (stannous);
   wherein Q represents at least one heteroatom grouping bonded to M, the core element, through a carbon-M bond;
   wherein R is selected from the group consisting of: heteroatom-containing groups bonded to M, the core element, through the heteroatom site, alkyls, aryls, alkaryls, aralkyls, halogens, halogen substituted aryls, halogen substituted alkaryls, and pseudohalides; and
   wherein x and y are positive integers, a sum of x plus y being equal to one plus the valence of the core element M, and further,
   wherein x can be zero.

2. The electrolyte of claim 1, wherein said solvent preferably comprises at least one ether.

3. The electrolyte of claim 2, wherein one of said preferred ethers is dioxolane.

4. The electrolyte of claim 3, wherein said dioxolane is mixed with dimethoxyethane.

5. The electrolyte of claim 1, wherein Z is preferably selected from a group consisting of: Li, Na, and K.

6. The electrolyte of claim 5, wherein Z is preferably Li.

7. The electrolyte of claim 1, wherein M is preferably B.

8. The electrolyte of claim 1, wherein the heteroatom groupings defined by Q are selected from a group consisting of:

where: X' is an alkyl having 1 to 3 carbon atoms.

9. The electrolyte of claim 1, wherein the heteroatom groupings defined by Q are bonded to M in a cyclic structure such as:

where: Y is O, S, or NX', and X' is an alkyl having 1 to 3 carbon atoms.

10. The electrolyte of claim 9, wherein the heteroatom groupings defined by Q can be the same or different.

11. The electrolyte of claim 1 wherein the heteroatom groupings defined by Q can be the same or different.

12. The electrolyte of claim 1, wherein at least one heteroatom grouping as defined by Q and at least one heteroatom-containing group as defined by R are bonded to M.

13. The electrolyte of claim 1, wherein M is boron and wherein two heteroatom groupings defined by Q and two groups defined by R are bonded to M.

14. The electrolyte of claim 13, wherein all the Q heteroatom groupings are the same, and all the R groups are the same.

15. The electrolyte of claim 14, wherein all the R groups are phenyl groups.

16. The electrolyte of claim 1, wherein the heteroatom-containing groups defined by R are selected from a group consisting of:

-continued where X' is an alkyl having 1 to 3 carbon atoms.

17. The electrolyte of claim 16, wherein the heteroatom-containing groups defined by R are preferably 18. The electrolyte of claim 1, wherein the pseudohalides defined by R are selected from a group consisting of: $SCN^-$; $SeCN^-$; $CN^-$; and $OCN^-$.

19. The electrolyte of claim 1, wherein the alkali-metal electrochemical device is a lithium battery cell hving a solid electrode for a cathode.

20. The electrolyte of claim 1, wherein the alkali-metal electrochemical device is a Li/TiS$_2$ battery.

* * * * *